US010061989B2

United States Patent
Kanna et al.

(10) Patent No.: US 10,061,989 B2
(45) Date of Patent: Aug. 28, 2018

(54) INFORMATION TRANSFER APPARATUS AND METHOD FOR IMAGE RECOGNITION

(71) Applicant: NEC Corporation, Minato-ku, Tokyo (JP)

(72) Inventors: Yoshihiro Kanna, Tokyo (JP); Nobutatsu Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 15/075,376

(22) Filed: Mar. 21, 2016

(65) Prior Publication Data

US 2016/0292512 A1    Oct. 6, 2016

(30) Foreign Application Priority Data

Mar. 30, 2015    (JP) ................................. 2015-070110

(51) Int. Cl.
*G06K 9/00*    (2006.01)
*G06K 9/62*    (2006.01)

(52) U.S. Cl.
CPC ....... *G06K 9/00771* (2013.01); *G06K 9/6215* (2013.01); *G06K 9/6256* (2013.01)

(58) Field of Classification Search
CPC ........... G06K 9/00288; G06K 9/00771; G06K 9/6256; G06K 9/6215; G06K 9/6267; G06K 9/00456

See application file for complete search history.

(56) References Cited

U.S. PATENT DOCUMENTS

| 8,832,096 B1* | 9/2014 | Jing ................. G06F 17/30247 707/706 |
| 2014/0334746 A1* | 11/2014 | Petrou .............. G06F 17/30253 382/306 |
| 2015/0161482 A1* | 6/2015 | Preetham ............ G06K 9/6256 382/159 |
| 2015/0347841 A1* | 12/2015 | Mears ................ G06K 9/00604 348/46 |
| 2016/0125265 A1* | 5/2016 | Xie ..................... G06K 9/6202 382/209 |

FOREIGN PATENT DOCUMENTS

| JP | H10-21393 A | 1/1998 |
| JP | 2001-292981 A | 10/2001 |
| JP | 2003-099778 A | 4/2003 |
| JP | 4752836 B2 | 8/2011 |
| JP | 4828411 B2 | 11/2011 |
| JP | 2012-088787 A | 5/2012 |

\* cited by examiner

*Primary Examiner* — Kenny Cese

(57) ABSTRACT

A learning system (100) includes an information transfer apparatus (10) and a learning processing apparatus (20). The information transfer apparatus (10) includes: an analysis unit (11) that obtains data serving as a learning target, compares the obtained data with a reference model, and assigns, to the data, an index indicating a degree of worthiness of the data as the learning target; and a transmission processing unit (12) that transmits the data to the learning processing apparatus (20) based on a rule that has been set using the index. The learning processing apparatus (20) includes a learning processing unit (21) that updates the model or generates a new model based on the data transmitted from the information transfer apparatus (10).

5 Claims, 17 Drawing Sheets

Fig.8

| RULE LABEL | CERTAINTY DEGREE | TRANSMISSION RATE | SET NUMBER |
|---|---|---|---|
| TRANSMIT ALL | 0.8 | 100% | 0 |
| TRANSMIT SMALL PART | 0.6 | 10% | 9 |
| TRANSMIT SMALLER PART | 0.3 | 1% | 99 |
| TRANSMIT NOTHING | 0.1 | 0% | −1 |

INFORMATION TRANSFER APPARATUS AND METHOD FOR IMAGE RECOGNITION

CROSS-REFERENCE TO RELATED APPLICATION

This application is based upon and claims the benefit of priority from Japanese patent application No. 2015-070110, filed on Mar. 30, 2015, the disclosure of which is incorporated herein in its entirety by reference.

BACKGROUND OF THE INVENTION

1. Field of the Invention

The present invention relates to an information transfer apparatus, a learning system using the same, an information transfer method, and a computer-readable recording medium for realizing them. In particular, the present invention relates to a technique for selectively transferring information used in learning processing for generating a learning model in an image analysis system using a machine learning technique.

2. Background Art

In recent years, surveillance cameras have rapidly become widespread. Surveillance cameras are installed across a vast area, e.g., on the streets, in stores and public facilities, and on highways. Due to the recent improvements in the performances of solid-state image sensors, the resolution of surveillance cameras is increasing. The bands necessary for image transmission are becoming broader as well.

A conventional surveillance system will now be described with reference to FIG. 16. FIG. 16 shows a schematic configuration of a conventional surveillance system utilizing a broadband network. As shown in FIG. 16, in a surveillance system 400, images from surveillance cameras 401 are transmitted to a surveillance server 403 via a network 402. The surveillance server 403 is installed in a location where an observer 404 is stationed, such as a surveillance room, and accumulates the transmitted images. The surveillance server 404 also displays the accumulated images on a screen of a terminal 406 of the observer 404.

This allows the observer 403 to perform surveillance by viewing the screen. A detection server 405 may be connected to the surveillance server 403. The detection server 405 has an automatic surveillance function, and can detect an intruder from the images (for example, see JP 2012-88787A). Thus, the use of the detection server 405 supports surveillance by the observer 404 and reduces the surveillance burden on the observer 404.

However, intensive surveillance of images from high-resolution cameras that are distributed across a vast area requires a broadband network (NW) as shown in FIG. 16, and is not practical as it increases the cost for constructing a surveillance system.

In view of this, a surveillance system has been suggested in which a surveillance camera itself has an automatic surveillance function, the surveillance camera alone performs automatic surveillance based on some sort of detection model, and a notification is issued to a surveillance room and the like only on the occurrence of an event serving as a surveillance target.

FIG. 17 shows a schematic configuration of a conventional surveillance system using surveillance cameras with an automatic surveillance function. In a surveillance system 500 shown in FIG. 17, surveillance cameras 501 issue a notification only on the occurrence of an abnormality, and thus a network 502 need not be a broadband network.

When each surveillance camera 501 itself has the automatic surveillance function as in an example shown in FIG. 17, it is critical for the surveillance cameras 501 to update their respective detection models to keep the detection models in a normal state. This is because, if no action is taken in response to an environmental change and a change in a surveillance target on an as-needed basis, erroneous detection and incomplete detection increase, and effective automatic surveillance cannot be continued.

It is possible to adopt a mode in which the surveillance cameras 501 update their respective detection models on an individual basis. However, it is difficult to adopt this mode because it is difficult for a single surveillance camera to secure resources necessary for updating a detection model. Another reason why it is difficult to adopt this mode is because updating a detection model requires external information for specifying a change in a surveillance target, as well as images from another surveillance camera. The detection models may be updated by human hand in accordance with the states of the surveillance cameras 501. However, an increase in the number of surveillance cameras would render this method unpractical in terms of workload and time.

In view of this, in the example shown in FIG. 17, a model update server 505 that updates the detection models of the surveillance cameras 501 is installed in addition to a surveillance server 503. The model update server 505 generates, for each surveillance camera, a detection model corresponding to an environmental change and a change in a surveillance target through learning of training data using a machine learning technique. The model update server 505 transfers the generated detection models to the surveillance cameras 501 to cause the surveillance cameras 501 to update their respective detection models. In FIG. 17, 504 denotes an observer, and 506 denotes a terminal of the observer.

However, in the surveillance system shown in FIG. 17, as the band of the network is limited, there is a restriction on data that can be transmitted from the surveillance cameras 501 to the model update server 505. Therefore, the surveillance system shown in FIG. 17 encounters the problem that the model update server 505 cannot accumulate sufficient training data, and it is difficult to dynamically update the detection models.

It is presumed that this problem can be solved by selectively transmitting only data that is worth learning to the model update server 505 in accordance with the band of the network. However, in the conventional surveillance system shown in FIG. 17, the surveillance camera 501 does not have such a function, and thus it is difficult to selectively transmit data that is worth learning.

SUMMARY OF THE INVENTION

An exemplary object of the present invention is to provide an information transfer apparatus that can solve the above problem by selectively transmitting data that is worth learning, as well as a learning system using the information transfer apparatus, an information transfer method, and a computer-readable recording medium.

To achieve the above object, an information transfer apparatus according to one aspect of the present invention includes: an analysis unit that obtains data serving as a learning target, compares the obtained data with a reference model, and assigns, to the data, an index indicating a degree of worthiness of the data as the learning target; and a transmission processing unit that transmits the data to the outside based on a rule that has been set using the index.

To achieve the above object, an information transfer system according to another aspect of the present invention includes an information transfer apparatus and a learning processing apparatus. The information transfer apparatus includes: an analysis unit that obtains data serving as a learning target, compares the obtained data with a reference model, and assigns, to the data, an index indicating a degree of worthiness of the data as the learning target; and a transmission processing unit that transmits the data to the learning processing apparatus based on a rule that has been set using the index. The learning processing apparatus includes a learning processing unit that updates the model or generates a new model based on the data transmitted from the information transfer apparatus.

To achieve the above object, an information transfer method according to still another aspect of the present invention includes: (a) a step of obtaining data serving as a learning target, comparing the obtained data with a reference model, and assigning, to the data, an index indicating a degree of worthiness of the data as the learning target; and (b) a step of transmitting the data to the outside based on a rule that has been set using the index.

To achieve the above object, a computer-readable recording medium according to still another aspect of the present invention has recorded therein a program including an instruction that causes a computer to execute: (a) a step of obtaining data serving as a learning target, comparing the obtained data with a reference model, and assigning, to the data, an index indicating a degree of worthiness of the data as the learning target; and (b) a step of transmitting the data to the outside based on a rule that has been set using the index.

As described above, the present invention enables selective transmission of data that is worth learning.

BRIEF DESCRIPTION OF THE DRAWINGS

FIG. 8 shows examples of rules used in the second embodiment of the present invention.

EXEMPLARY EMBODIMENTS (Overview of Invention)

Figure 1:
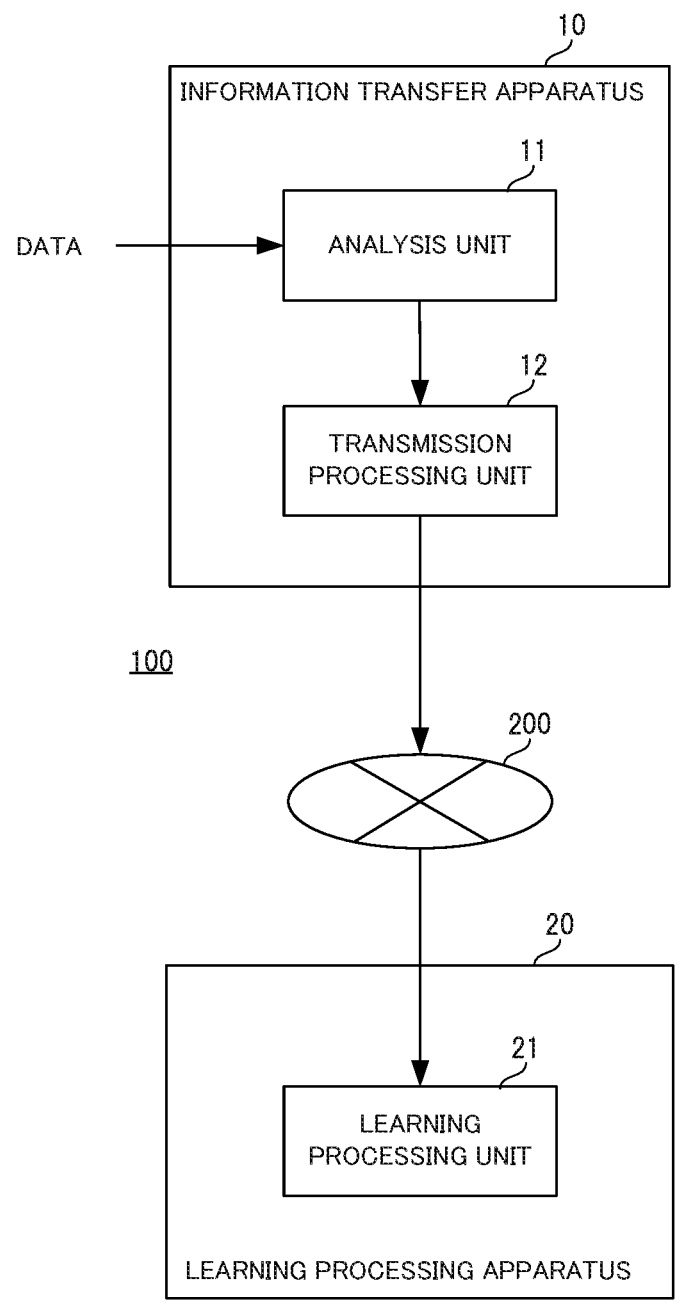
FIG. 1 is a block diagram showing schematic configurations of an information transfer apparatus and a learning system according to a first embodiment of the present invention.

The following describes an overview of the present invention, using an exemplary case in which the present invention is used in a surveillance system.

In the surveillance system, first, a default detection model is set in a surveillance camera. This detection model is generated through machine learning performed by a surveillance server using training data, and downloaded to the surveillance camera. For example, this training data can be obtained by assigning, to an arbitrary image, a label indicating whether or not a target object to be detected appears in the image. The image is captured by the surveillance camera in which the detection model is to be set.

An information transfer apparatus of the present invention is built in the surveillance camera, and calculates reliability by determining whether or not the target object to be detected appears in image data based on the detection model. If the determination result shows that the reliability is higher than or equal to a preset threshold, the surveillance camera transmits the image data serving as a determination target to the surveillance server. Even if the determination result shows that the reliability is lower than the threshold, the information transfer apparatus transmits the image data to the surveillance server (center) at a preset frequency.

As a result, the surveillance server accumulates not only image data in which the target object has been successfully detected (hereinafter referred to as "detection data"), but also image data in which detection of the target object has failed (hereinafter referred to as "non-detection data"). An administrator of the surveillance system checks whether or not the accumulated non-detection data contains image data in which the target object to be detected appears.

If the administrator finds the image data in which the target object to be detected appears as a result of the check, the administrator assigns, to the image data, a label indicating that the target object to be detected appears in the image data. On the other hand, the administrator assigns, to image data in which the target object to be detected does not appear, a label indicating that the target object to be detected does not appear in the image data.

Then, the administrator causes the surveillance server to perform learning again using the detection data and the non-detection data that has been assigned such labels, and update the detection model. Thereafter, the surveillance server causes the surveillance camera to download the updated detection model.

As such, in the present invention, only a minimum necessary portion of non-detection data in which the target object to be detected does not appear is transmitted to the surveillance server. Therefore, even in the case of a narrow-band network, a dynamic update of the detection model can easily be performed, and the detection precision can be improved.

(First Embodiment)

A description is now given of an information transfer apparatus, a learning system, an information transfer method, and programs according to a first embodiment of the present invention with reference to FIGS. 1 to 6.

[System Configuration]

First, schematic configurations of the information transfer apparatus and the learning system according to the first embodiment of the present invention will be described with reference to FIG. 1. FIG. 1 is a block diagram showing the schematic configurations of the information transfer apparatus and the learning system according to the first embodiment of the present invention.

As shown in FIG. 1, a learning system 100 according to the present first embodiment includes an information transfer apparatus 10 and a learning processing apparatus 20. The information transfer apparatus 10 and the learning processing apparatus 20 are connected via a network 200.

As shown in FIG. 1, the information transfer apparatus 10 includes an analysis unit 11 and a transmission processing unit 12. The analysis unit 11 obtains data serving as a learning target, compares the obtained data with a reference model, and assigns, to the data, an index indicating a degree of worthiness of the data as the learning target. The transmission processing unit 12 transmits the data to the learning processing apparatus 20 based on a rule that has been set using the index.

The learning processing apparatus 20 includes a learning processing unit 21. Based on the data transmitted from the information transfer apparatus 10, the learning processing unit 21 updates a model used in the information transfer apparatus, or generates a new model.

As such, in the present first embodiment, the information transfer apparatus 10 can selectively transmit data that is worth learning by assigning an index to data. This makes it possible to dynamically update a model, even in the case of a narrowband network.

Figure 2:
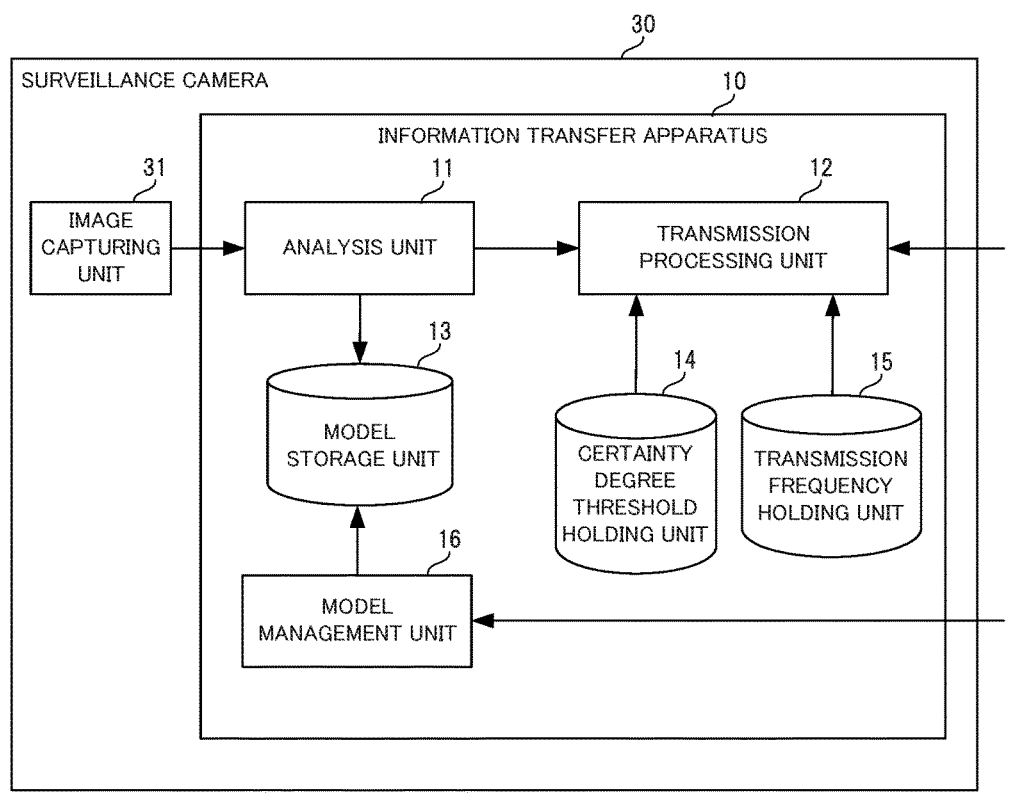
FIG. 2 is a block diagram showing a specific configuration of the information transfer apparatus according to the first embodiment of the present invention.
Figure 3:
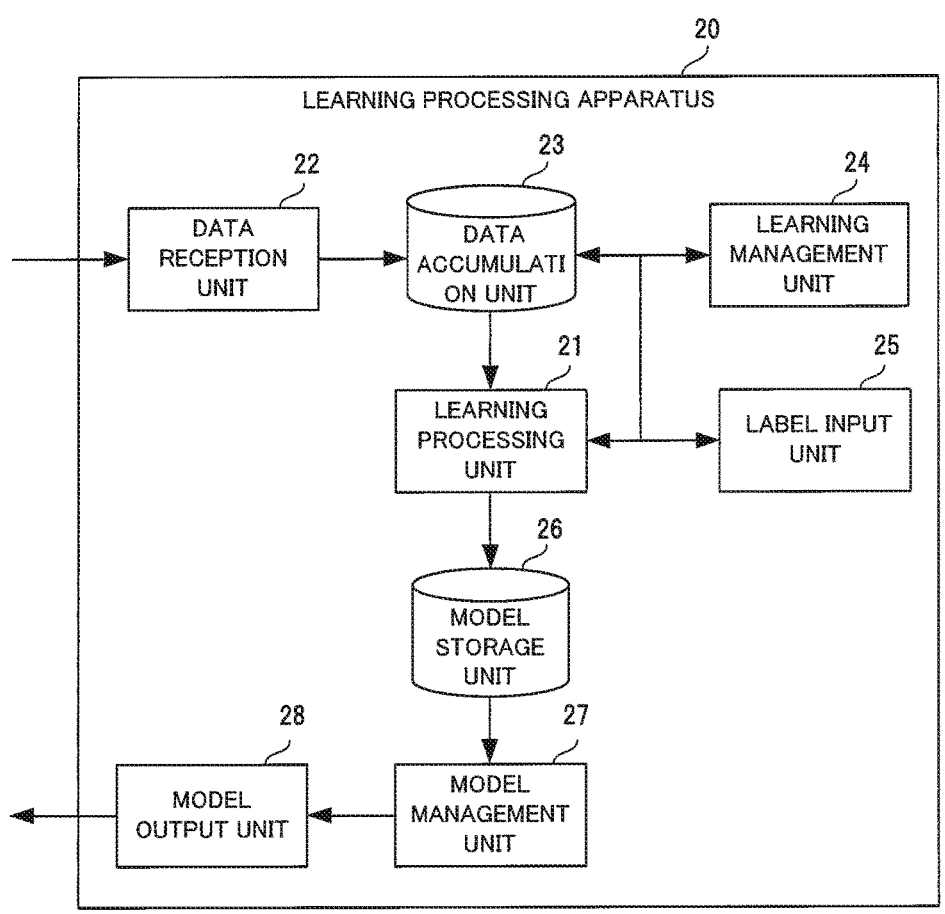
FIG. 3 is a block diagram showing a specific configuration of a learning processing apparatus according to the first embodiment of the present invention.

Next, a description is given of a specific configuration of the information transfer apparatus according to the present first embodiment with reference to FIGS. 2 and 3. FIG. 2 is a block diagram showing the specific configuration of the information transfer apparatus according to the first embodiment of the present invention.

As shown in FIG. 2, in the present first embodiment, the information transfer apparatus 10 is a part of a surveillance camera 30. The surveillance camera 30 includes the information transfer apparatus 10 and an image capturing unit 31. The image capturing unit 31 includes a solid-state image sensor (not illustrated), and outputs image data. Note that the information transfer apparatus 10 may be provided separately from the surveillance camera. In this case, the information transfer apparatus 10 is connected to the surveillance camera via a cable or the like.

In the present first embodiment, the information transfer apparatus 10 is not limited to being used for the surveillance camera. For example, the information transfer apparatus 10 may be used for a motion detector utilizing infrared. Alternatively, the information transfer apparatus 10 may be used for an information terminal, such as a smartphone, equipped with an acceleration sensor, an angular velocity sensor, etc.

In the present first embodiment, the analysis unit 11 obtains the image data output from the image capturing unit 31 as learning data. The analysis unit 11 determines whether or not a target object appears in the obtained image data by comparing the image data with a reference model, and assigns certainty degrees as indexes to the image data in accordance with the determination result. The certainty degrees are the indexes indicating how certain it is that the target object appears in the image data.

In the present first embodiment, the transmission processing unit 12 uses a rule that has been set using the certainty degrees. Specifically, the rule stipulates that "all image data with a certainty degree higher than a threshold is transmitted, and image data with certainty degrees lower than or equal to the threshold is transmitted such that a transmission frequency matches a set value." The transmission processing unit 12 transmits the image data to the learning processing apparatus 20 based on the rule that has been set using the certainty degrees.

As shown in FIG. 2, in the present first embodiment, the information transfer apparatus 10 includes a model storage unit 13, a certainty degree threshold holding unit 14, a transmission frequency holding unit 15, and a model management unit 16, in addition to the analysis unit 11 and the transmission processing unit 12.

Among these, the model storage unit 13 stores the reference model used by the analysis unit 11 (hereinafter referred to as a "detection model"). The certainty degree threshold holding unit 14 holds the aforementioned threshold used by the rule. The transmission frequency holding unit 15 holds the aforementioned set value for the transmission frequency used by the rule.

The model management unit 16 receives an updated detection model or a newly generated detection model transmitted from the learning processing apparatus 10. The model management unit 16 stores the obtained detection model to the model storage unit 13 to update the detection model used by the analysis unit 11.

Next, a description is given of a specific configuration of the learning processing apparatus according to the present first embodiment with reference to FIG. 3. FIG. 3 is a block diagram showing a specific configuration of the learning processing apparatus according to the first embodiment of the present invention.

As shown in FIG. 3, the learning processing apparatus 20 includes a data reception unit 22, a data accumulation unit 23, a learning management unit 24, a label input unit 25, a model storage unit 26, a model management unit 27, and a model output unit 28, in addition to the aforementioned learning processing unit 21.

The data reception unit 22 receives image data transmitted from the transmission processing unit 12 of the information transfer apparatus 10, and accumulates the image data in the data accumulation unit 23. The learning management unit 24 manages processing executed by the learning processing unit 21, and causes the learning processing unit 21 to update the existing detection model or generate a new detection model. The learning management unit 24 also manages the image data accumulated in the data accumulation unit 23.

In response to an external instruction from an administrator, the label input unit 25 assigns, to frames of the image data accumulated in the data accumulation unit 23, labels indicating whether or not the frames concerns a scene serving as a detection target. For example, the label input unit 25 assigns a numeric value "0" as a label to a frame that has been designated by the administrator as not concerning such a scene, and a numeric value "1" as a label to a frame that has been designated by the administrator as concerning such a scene.

In the present first embodiment, the learning processing unit 21 obtains image data serving as a learning target, specifically, image data whose frames have been assigned the labels, from the data accumulation unit 23. Using the obtained image data, the learning processing unit 21 also updates the existing detection model or generates a new detection model. The learning processing unit 21 stores the updated or generated detection model to the model storage unit 26.

The model management unit 27 selects, from among detection models stored in the model storage unit 26, a detection model to be transmitted to a transmission destination, that is to say, the surveillance camera 30, and causes the model output unit 28 to transmit the selected detection model to the surveillance camera 30.

[System Operations]

Figure 4:
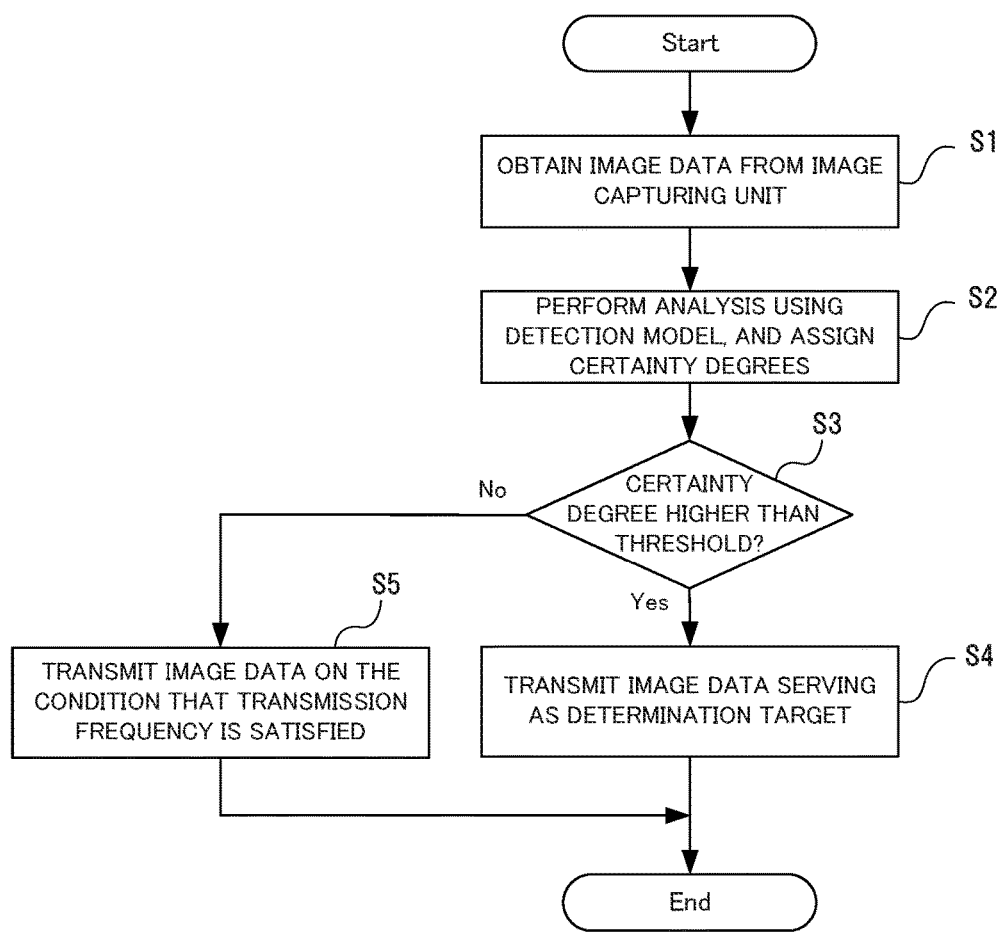
FIG. 4 is a flowchart of the operations performed by the information transfer apparatus according to the first embodiment of the present invention during processing for transmitting image data.
Figure 5:
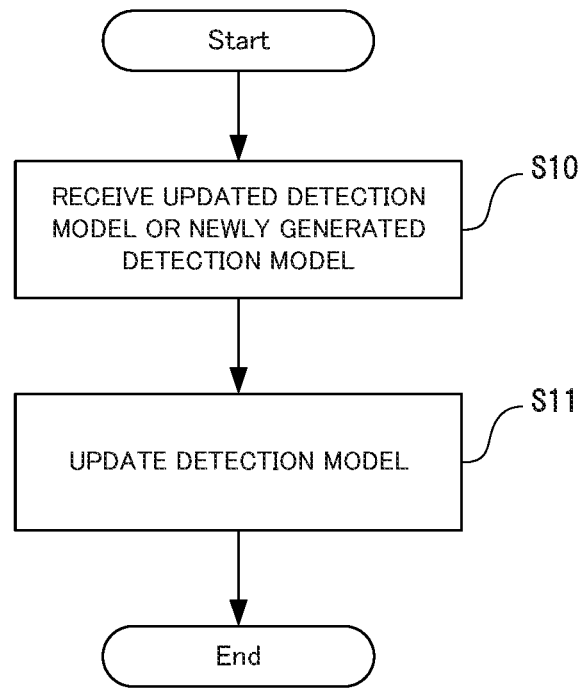
FIG. 5 is a flowchart of the operations performed by the information transfer apparatus according to the first embodiment of the present invention during processing for updating a detection model.

Next, a description is given of the operations of the information transfer apparatus 10 and the learning processing apparatus 20 according to the present first embodiment with reference to FIGS. 4 and 5. In the present first embodiment, the information transfer method is implemented by causing the information transfer apparatus 10 to operate. Therefore, the following description of the operations of the information transfer apparatus 10 applies to the information transfer method according to the present first embodiment.

First, a description is given of the operations performed by the information transfer apparatus 10 according to the present first embodiment during processing for transmitting image data with reference to FIG. 4. FIG. 4 is a flowchart of the operations performed by the information transfer apparatus according to the first embodiment of the present invention during processing for transmitting image data.

First, as shown in FIG. 4, the analysis unit 11 obtains image data from the image capturing unit 31 (step S1). Next, the analysis unit 11 reads in a detection model from the model storage unit 13, determines whether or not a target object to be detected appears in frames of the image data, on a frame-by-frame basis, based on the detection model that has been read in, and assigns certainty degrees in accordance with the determination result (step S2).

Specifically, in step S2, for example, the analysis unit 11 assigns "1.0" as a certainty degree to a frame serving as a determination target if it is determined that the target object appears in the frame. The analysis unit 11 assigns "0.0" as a certainty degree to a frame serving as the determination target if it is determined that the target object does not appear in the frame. The analysis unit 11 assigns "0.5" as a certainty degree to a frame serving as the determination target if it cannot determine whether or not the target object appears in the frame.

Next, the transmission processing unit 12 obtains the image data to which the certainty degrees were assigned in step S2, obtains a threshold from the certainty degree threshold holding unit 14, and obtains a set value for a transmission frequency from the transmission frequency holding unit 15. Then, the transmission processing unit 12 determines whether or not the certainty degrees assigned to the image data are higher than the threshold (step S3).

If the result of determination in step S3 shows that the certainty degree assigned to the image data (frame) serving as the determination target is higher than the threshold, the transmission processing unit 12 transmits this image data to the learning processing apparatus 20 (step S4).

On the other hand, if the result of determination in step S3 shows that the certainty degree assigned to the image data (frame) serving as the determination target is lower than or equal to the threshold, the transmission processing unit 12 transmits this image data to the learning processing apparatus 20 such that the transmission frequency matches the set value (step S5). Specifically, for example, when the set value for the transmission frequency is 0.01, the transmission processing unit 12 transmits one in every 100 pieces of image data with certainty degrees lower than or equal to the threshold.

After step S4 or S5 is executed, processing ends. However, upon transmission of image data from the image capturing unit 31, step S1 is executed again. Steps S1 to S5 are executed repeatedly during transmission of image data from the image capturing unit 31.

Next, a description is given of the operations performed by the information transfer apparatus 10 according to the present first embodiment during processing for updating a detection model for image data with reference to FIG. 5. FIG. 5 is a flowchart of the operations performed by the information transfer apparatus according to the first embodiment of the present invention during processing for updating a detection model.

As shown in FIG. 5, first, in the information transfer apparatus 10, the model management unit 16 receives an updated detection model or a newly generated detection model transmitted from the learning processing apparatus 20 (step S10).

Next, the model management unit 16 stores the obtained detection model to the model storage unit 13 to update the detection model used by the analysis unit 11 (step S11). After step S11 is executed, the analysis unit 11 executes step S2 using the updated detection model.

Figure 6:
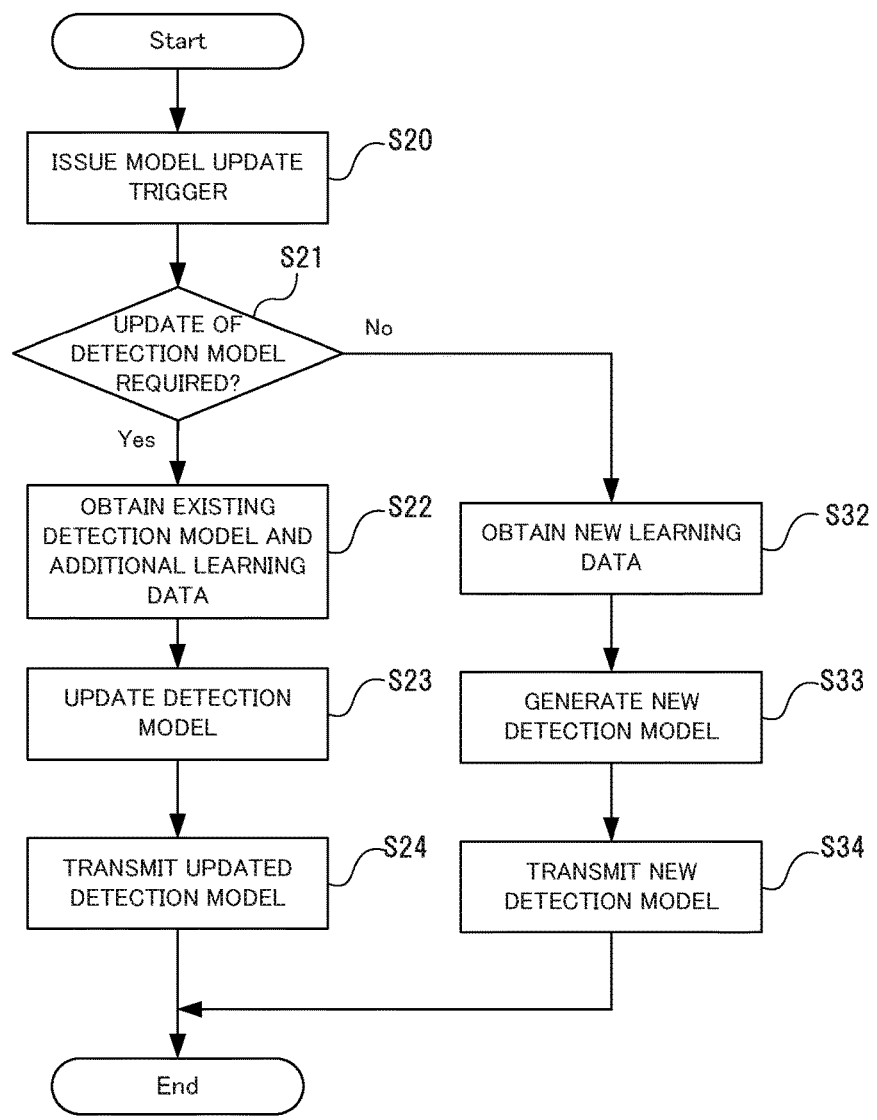
FIG. 6 is a flowchart of the operations of the learning processing apparatus according to the first embodiment of the present invention.

Next, a description is given of the operations of the learning processing apparatus 20 according to the present first embodiment with reference to FIG. 6. FIG. 6 is a flowchart of the operations of the learning processing apparatus according to the first embodiment of the present invention.

As shown in FIG. 6, the learning management unit 24 issues a model update trigger upon the occurrence of such events as external input, a decrease in the precision of detection by the surveillance camera 30, and an abnormal frequency of detection by the surveillance camera 30 (step S20).

Next, the learning management unit 24 determines whether or not the purpose of the issuance of the model update trigger requires an update of a detection model for improvement of the precision of the detection model, addition of a detection target, and so on (step S21).

If the result of determination in step S21 shows that the purpose of the issuance of the model update trigger requires the update of the detection model, the learning management unit 24 instructs the learning processing unit 21 to update the detection model. The learning processing unit 21 accordingly obtains the existing detection model and image data serving as additional learning data from the data accumulation unit 23 (step S22).

Next, the learning processing unit 21 updates the existing detection model using the detection model and the image data obtained in step S22 (step S23), and stores the updated detection model to the model storage unit 26.

Next, the model management unit 27 passes the updated detection model to the model output unit 28, and causes the model output unit 28 to transmit the updated detection model to the transmission destination, that is to say, the surveillance camera 30 (step S24).

On the other hand, if the result of determination in step S21 shows that the purpose of the issuance of the model update trigger does not require the update of the detection model, that is to say, requires generation of a new detection model, the learning management unit 24 instructs the learning processing unit 21 to generate a new detection model. The learning processing unit 21 accordingly obtains image data serving as new learning data from the data accumulation unit 23 (step S32).

Next, the learning processing unit 21 generates a new detection model using the image data obtained in step S32 (step S33), and stores the generated detection model to the model storage unit 26.

Next, the model management unit 27 passes the newly generated detection model to the model output unit 28, and causes the model output unit 28 to transmit the newly generated detection model to the transmission destination, that is to say, the surveillance camera 30 (step S34). Once step S24 or S34 has been executed, the information transfer apparatus 10 executes steps S10 and S11 described earlier.

[Effects of First Embodiment]

As described above, in the present first embodiment, a detection model can be dynamically updated to prevent degradation of the detection model, even in an environment where the information transfer apparatus has poor resources and the band of the network between the information transfer apparatus and the learning processing apparatus is narrow. Furthermore, the detection model can be flexibly changed. Therefore, when these apparatuses according to the present first embodiment are used in a surveillance system, effective automatic surveillance can be continued.

Moreover, as the present first embodiment can be realized without adding special hardware to the surveillance camera 30, the introductory cost can be reduced. The present first embodiment can also suppress the cost of network construction.

[Programs]

It is sufficient for a first program according to the present first embodiment to cause a computer to execute steps S1 to S5 shown in FIG. 4 and steps S10 and S11 shown in FIG. 5. The information transfer apparatus 10 and the information transfer method according to the present embodiment can be realized by installing this program in the computer and executing the installed program. In this case, a central processing unit (CPU) of the computer functions as the analysis unit 11, the transmission processing unit 12, and the model management unit 16, and executes processing.

It is sufficient for a second program according to the present first embodiment to cause the computer to execute steps S20 to S34 shown in FIG. 6. The learning processing apparatus 20 according to the present embodiment can be realized by installing this program in the computer and executing the installed program. In this case, the central processing unit (CPU) of the computer functions as the learning processing unit 21, the data reception unit 22, the learning management unit 24, the label input unit 25, the model management unit 27, and the model output unit 28, and executes processing.

(Second Embodiment)

Figure 7:
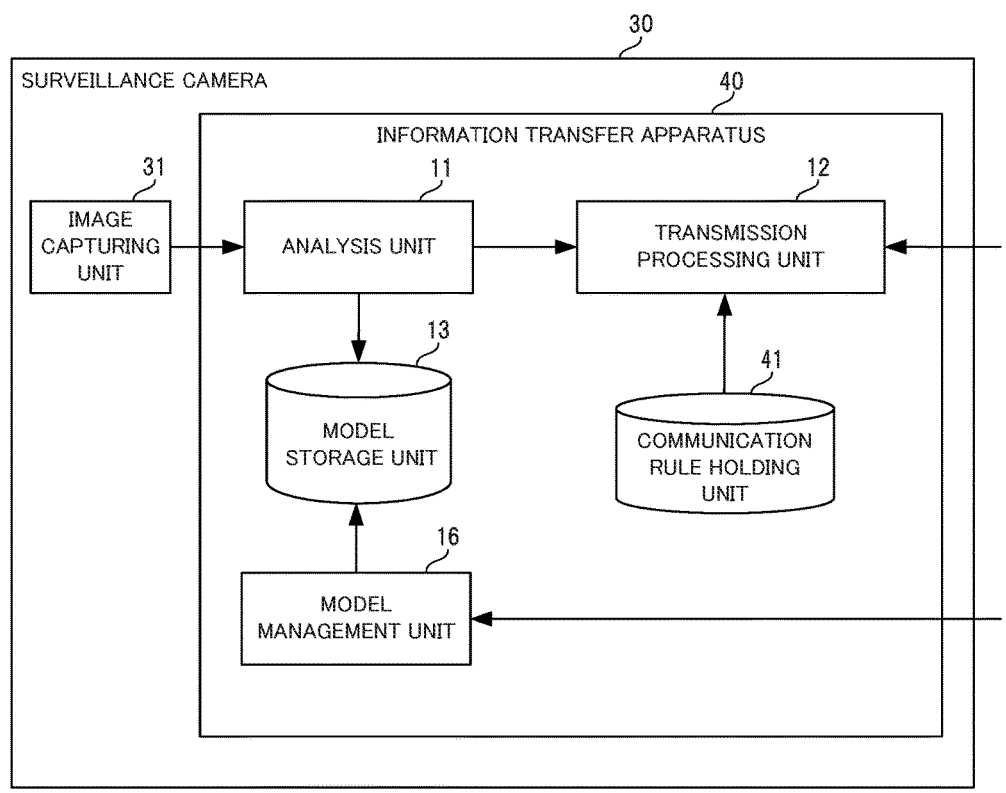
FIG. 7 is a block diagram showing a specific configuration of an information transfer apparatus according to a second embodiment of the present invention.
Figure 9:
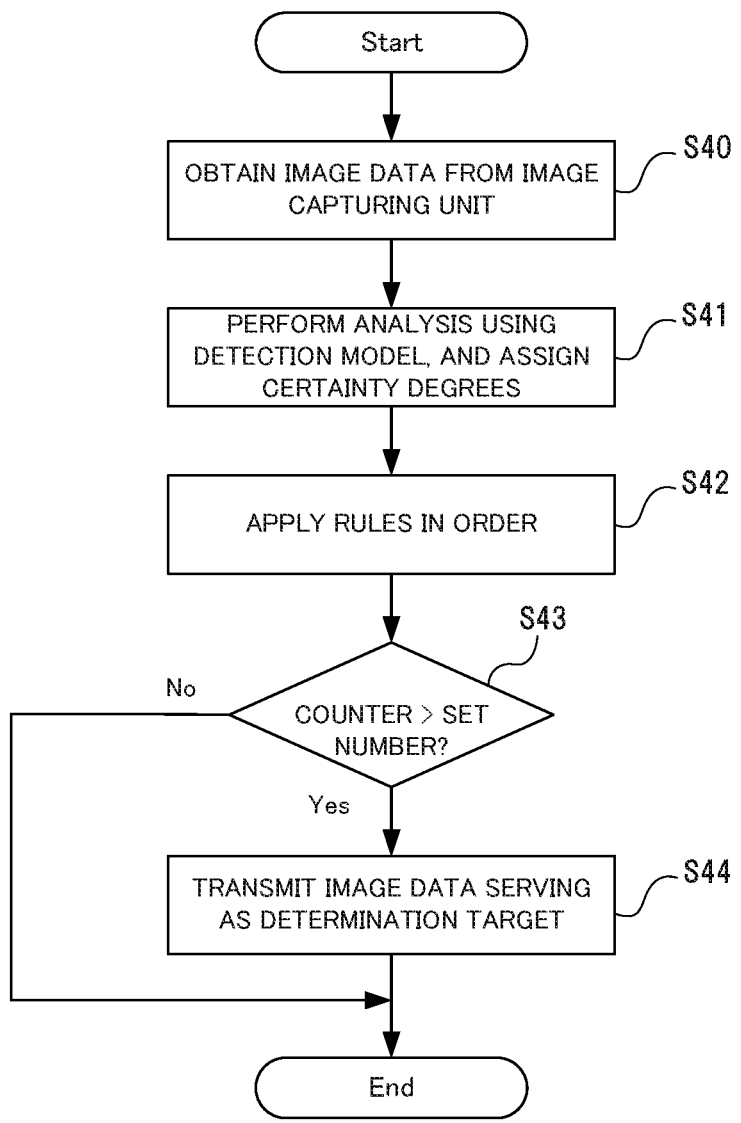
FIG. 9 is a flowchart of the operations performed by the information transfer apparatus according to the second embodiment of the present invention during processing for transmitting image data.

A description is now given of an information transfer apparatus, a learning system, an information transfer method, and programs according to a second embodiment of the present invention with reference to FIGS. 7 to 9.

[System Configuration]

First, schematic configurations of the information transfer apparatus and the learning system according to the second embodiment of the present invention will be described with reference to FIGS. 7 and 8. FIG. 7 is a block diagram showing a specific configuration of the information transfer apparatus according to the second embodiment of the present invention. FIG. 8 shows examples of rules used in the second embodiment of the present invention.

Note that the learning processing apparatus according to the present second embodiment is similar to the learning processing apparatus 20 according to the first embodiment shown in FIG. 1. Therefore, the following description centers on the information transfer apparatus according to the present second embodiment.

As shown in FIG. 7, an information transfer apparatus 40 according to the present second embodiment differs from the information transfer apparatus 10 according to the first embodiment in rules used by a transmission processing unit 12. Therefore, the information transfer apparatus 40 includes a communication rule holding unit 41 in place of the certainty degree threshold holding unit 14 and the transmission frequency holding unit 15 shown in FIG. 2.

The communication rule holding unit 41 holds a plurality of rules stipulating that, when the number of times a certainty degree has exceeded a threshold is larger than a set number, the most recent image data with a certainty degree higher than the threshold is transmitted. The threshold is different for each rule. In the present second embodiment, the transmission processing unit 12 applies the rules in descending order of the threshold until a certainty degree exceeds the threshold.

Specifically, in an example shown in FIG. 8, the communication rule holding unit 41 holds four rules that have different thresholds for a certainty degree. Each rule includes a rule label, a threshold for a certainty degree, and a transmission rate. Each rule is also associated with the aforementioned set number. The transmission processing unit 12 applies the rules shown in FIG. 8 in descending order of the threshold. If any of the rules has been applied, the subsequent rule(s) is not applied.

For example, assume that there is image data with a certainty degree X, and the transmission rate corresponding thereto is r%. In this case, the set number can be calculated using the following Expression 1. If the certainty degree of the image data matches any of the rules, the transmission processing unit 12 increments a value of a counter c by one. If the value of the counter c exceeds the set number associated with that rule ($c>(100/r)-1$), the transmission processing unit 12 transmits the image data, and resets the counter c.

$$\text{Set number}=(100/r)-1 \qquad \text{Expression 1}$$

Note that the transmission processing unit 12 executes the foregoing transmission processing only when the set number calculated using this Expression 1 is larger than or equal to "0." When a rule associated with a set number smaller than 0 is applied, as in the case of "transmit nothing" shown in FIG. 8, the transmission processing unit 12 does not execute the foregoing transmission processing, i.e., does not transmit image data at any time.

[System Operations]

Next, a description is given of the operations of the information transfer apparatus 40 according to the present second embodiment with reference to FIG. 9. FIG. 9 is a flowchart of the operations performed by the information transfer apparatus according to the second embodiment of the present invention during processing for transmitting image data. In the present second embodiment, the information transfer method is implemented by causing the information transfer apparatus 40 to operate. Therefore, the following description of the operations of the information transfer apparatus 40 applies to the information transfer method according to the present second embodiment.

First, as shown in FIG. 9, an analysis unit 11 obtains image data from an image capturing unit 31 (step S40). Next, the analysis unit 11 reads in a detection model from the model storage unit 13, determines whether or not a target object to be detected appears in frames of the image data, on a frame-by-frame basis, based on the detection model that has been read in, and assigns certainty degrees in accordance with the determination result (step S41). Note that steps S40 and S41 are similar to steps S1 and S2 shown in FIG. 4, respectively.

Next, the transmission processing unit 12 applies the rules in descending order of a threshold until a certainty degree exceeds the threshold (step S42). Next, the transmission processing unit 12 determines whether or not the value of the counter c is larger than the set number (step S43).

If the result of determination in step S43 shows that the value of the counter c is larger than the set number, the transmission processing unit 12 transmits the image data (frame) serving as a determination target to a learning processing apparatus 20 (step S44). On the other hand, if the result of determination in step S43 shows that the value of the counter c is smaller than or equal to the set number, the transmission processing unit 12 ends processing.

Upon transmission of image data from the image capturing unit 31, step S40 is executed again. Steps S40 to S44 are executed repeatedly during transmission of image data from the image capturing unit 31.

[Effects of Second Embodiment]

As described above, in the second embodiment, the plurality of rules can be applied, and hence a wide variety of communication amounts can be controlled. Furthermore, when the present second embodiment is used, a detection model can be dynamically updated to prevent degradation of the detection model, even in an environment where the information transfer apparatus has poor resources and the band of a network between the information transfer apparatus and the learning processing apparatus is narrow, similarly to the first embodiment.

[Programs]

It is sufficient for a program according to the present second embodiment to cause a computer to execute steps S40 to S44 shown in FIG. 9. The information transfer apparatus 40 and the information transfer method according to the present second embodiment can be realized by installing this program in the computer and executing the installed program. In this case, a central processing unit (CPU) of the computer functions as the analysis unit 11, the transmission processing unit 12, and a model management unit 16, and executes processing. Note that a program for configuring the learning processing apparatus according to the present second embodiment is similar to its counterpart according to the first embodiment.

(Third Embodiment)

Figure 10:
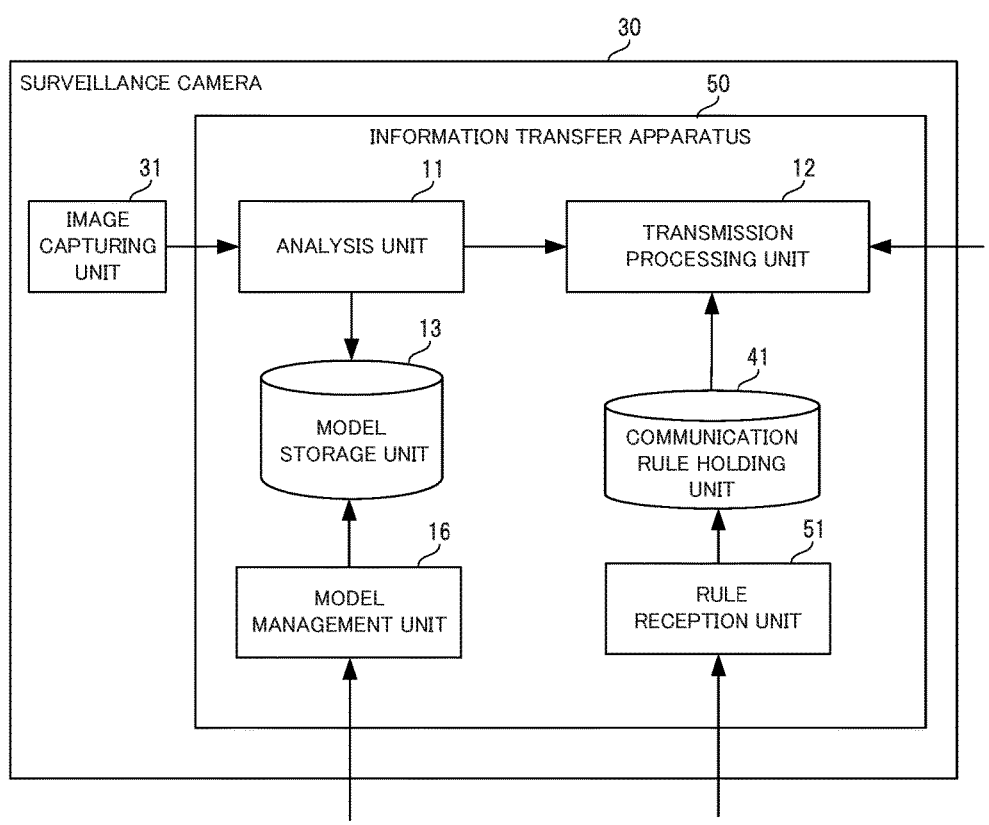
FIG. 10 is a block diagram showing a specific configuration of an information transfer apparatus according to a third embodiment of the present invention.
Figure 11:
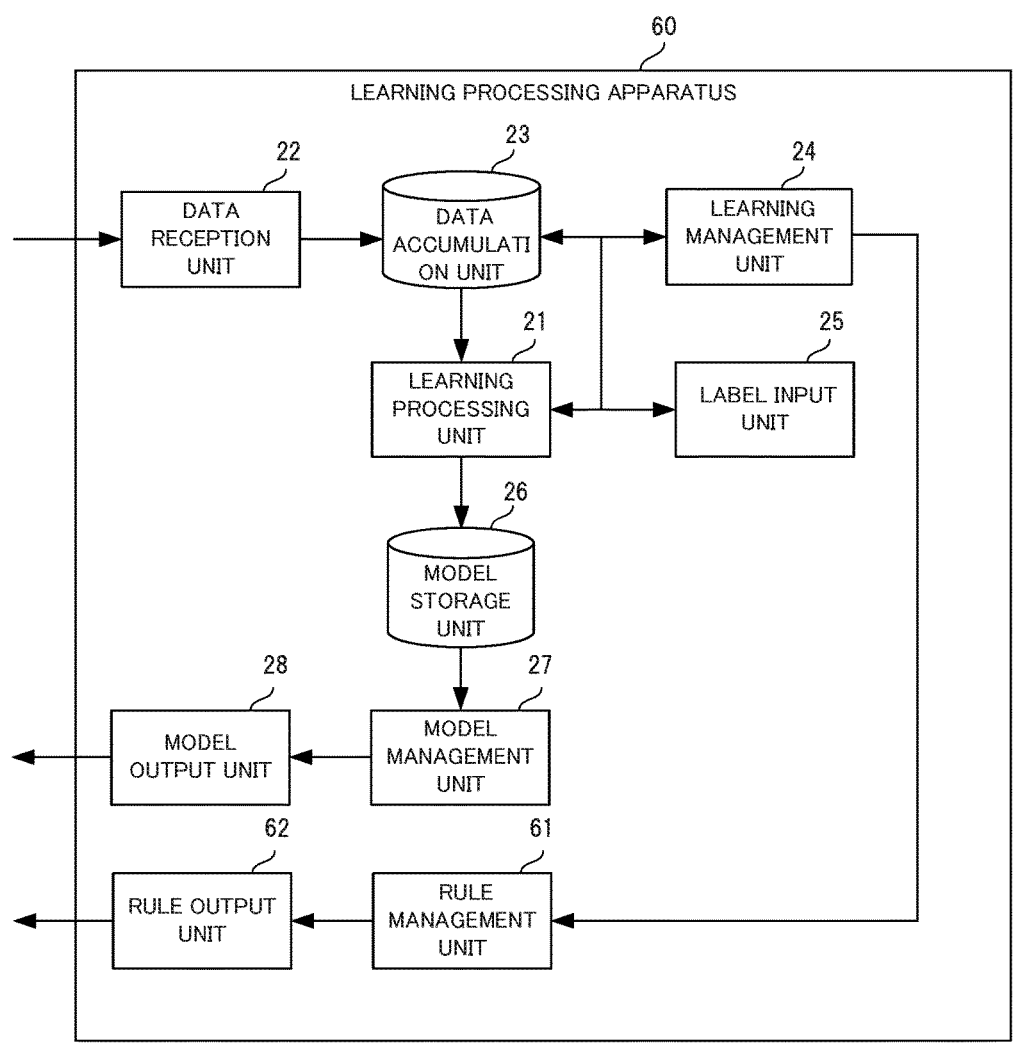
FIG. 11 is a block diagram showing a specific configuration of a learning processing apparatus according to the third embodiment of the present invention.

A description is now given of an information transfer apparatus, a learning system, an information transfer method, and programs according to a third embodiment of the present invention with reference to FIGS. 10 and 11. FIG. 10 is a block diagram showing a specific configuration of the information transfer apparatus according to the third embodiment of the present invention. FIG. 11 is a block diagram showing a specific configuration of a learning processing apparatus according to the third embodiment of the present invention.

As shown in FIG. 10, an information transfer apparatus 50 according to the present third embodiment differs from the information transfer apparatus 40 according to the second embodiment shown in FIG. 7 in including a rule reception unit 51. Other than this difference, the information transfer apparatus 50 is configured in a manner similar to the information transfer apparatus 40.

Furthermore, as shown in FIG. 11, a learning processing apparatus 60 according to the present third embodiment differs from the learning processing apparatus 20 according to the first embodiment shown in FIG. 3 in including a rule management unit 61 and a rule output unit 62. Other than this difference, the learning processing apparatus 60 is configured in a manner similar to the learning processing apparatus 20.

The following description centers on the differences between the present third embodiment and the first and second embodiments. First, in the learning processing apparatus 60, the rule management unit 61 causes the information transfer apparatus 50 to change a rule.

For example, if there is a surveillance camera 30 with a lowered detection precision, a learning management unit 24 updates or re-generates a detection model used by this surveillance camera 30. In this case, the rule management unit 61 instructs the surveillance camera 30 with the lowered detection precision to change a rule so that a larger amount of image data can be obtained from this surveillance camera 30.

Specifically, the rule management unit 61 generates a new rule or selects an appropriate rule from among rules that have been generated in advance, and transmits the new rule or the selected rule to the designated surveillance camera 30 via the rule output unit 62. Accordingly, in the information transfer apparatus 50, the rule reception unit 51 receives the transmitted rule and causes a communication rule holding unit 41 to hold the received rule.

Thereafter, due to the change in the rule, the surveillance camera 30 transmits a sufficient amount of learning data (image data) to the learning processing apparatus 60. Once such learning data has been newly accumulated, the learning processing apparatus 60 performs learning again, and updates a detection model or generates a new detection model. Then, the learning processing apparatus 60 distributes the updated or newly generated detection model to the surveillance camera 30.

According to the present third embodiment, a model can easily be regenerated in a case where a detection precision has been lowered due to such influences as a change in a background or light caused by construction of a new building within an image capturing range of a camera, an increase or decrease in the amount of traffic, and a change in the age group of pedestrians. In this case, the present third embodiment can improve the lowered precision.

In the present third embodiment, the information transfer method is implemented by causing the information transfer apparatus 50 to operate. In the present third embodiment, the information transfer apparatus 50 can be realized by a program for causing a computer to execute steps S40 to S44 shown in FIG. 9 and a step of receiving a transmitted rule and causing the communication rule holding unit 41 to hold the transmitted rule.

In the present third embodiment, the learning processing apparatus 60 can be realized by a program for causing the computer to execute steps S20 to S34 shown in FIG. 6, a step of generating or selecting a new rule, and a step of transmitting the new rule.

(Fourth Embodiment)

Figure 12:
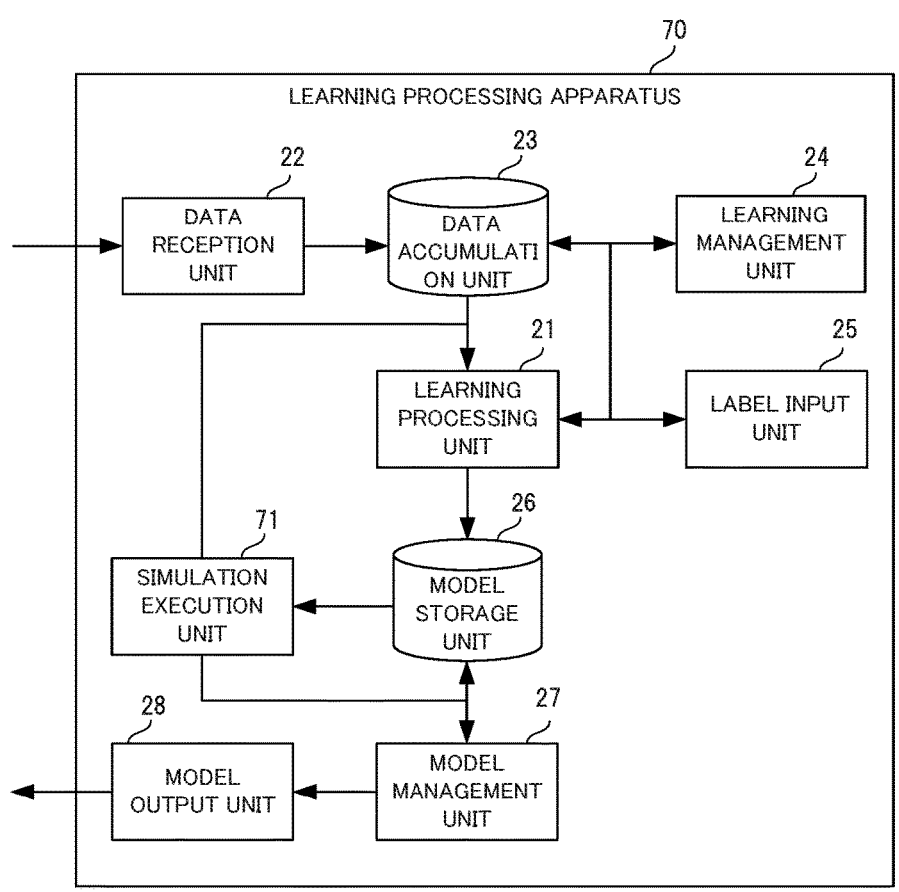
FIG. 12 is a block diagram showing a specific configuration of a learning processing apparatus according to a fourth embodiment of the present invention.

A description is now given of an information transfer apparatus, a learning system, an information transfer method, and programs according to a fourth embodiment of the present invention with reference to FIG. 12. FIG. 12 is a block diagram showing a specific configuration of a learning processing apparatus according to the fourth embodiment of the present invention.

The present fourth embodiment is based on the premise that a learning processing apparatus 70 is connected to a plurality of information transfer apparatuses (surveillance cameras). Furthermore, as shown in FIG. 12, the learning processing apparatus 70 according to the present fourth embodiment differs from the learning processing apparatus 20 according to the first embodiment shown in FIG. 3 in including a simulation execution unit 71. Other than this difference, the learning processing apparatus 70 is configured in a manner similar to the learning processing apparatus 20.

The following description centers on the difference between the present fourth embodiment and the first embodiment. First, in the learning processing apparatus 70, with the use of a detection model of one of the plurality of information transfer apparatuses, the simulation execution unit 71 determines whether or not a target object appears in image data transmitted from another information transfer apparatus.

That is to say, in the present fourth embodiment, when updating a detection model of a certain surveillance camera, the learning processing apparatus 70 performs a detection simulation with respect to accumulated image data from the certain surveillance camera with the use of a detection model generated through learning based on image data from another surveillance camera. The following functions can be realized by using the result of this simulation.

For example, assume a case in which there is a surveillance camera that has just been installed, and accumulated image data therefrom is insufficient. Also assume that, in this case, it has been confirmed that high-precision detection was enabled through a simulation using a detection model generated through learning based on another surveillance camera. Here, it is apparent that a sufficient detection precision can be achieved by transmitting the detection model of another surveillance camera to the surveillance camera that has just been installed, even without performing learning with the use of image data obtained through image capture by the surveillance camera that has just been installed.

Once such confirmation has been made, it can be determined that the image data obtained through image capture by the surveillance camera that has just been installed has features similar to the features of image data serving as the basis of the detection model used by another surveillance camera.

Therefore, in this case, an object area serving as a detection target is cut out from the image data serving as the basis of the detection model, and the area that has been cut out is inserted into the image data obtained through image capture by the surveillance camera that has just been installed. A simulation can be performed with respect to the resultant image data. The amount of image data used in learning can be increased by selecting image data for which appropriate detection was performed from the simulation result, and by accumulating the selected image data. Thereafter, by performing learning with the use of such accumulated image data, an appropriate detection model can be generated for the surveillance camera that has just been installed.

In the present fourth embodiment also, the information transfer method is implemented by causing the information transfer apparatuses to operate. In the present fourth embodiment, the information transfer apparatuses can be realized by a corresponding one of the programs described in the first to third embodiments. In the present fourth embodiment, the learning processing apparatus 70 can be realized by a program for causing a computer to execute steps S20 to S34 shown in FIG. 6 and a step of executing a simulation.

(Fifth Embodiment)

Figure 13:
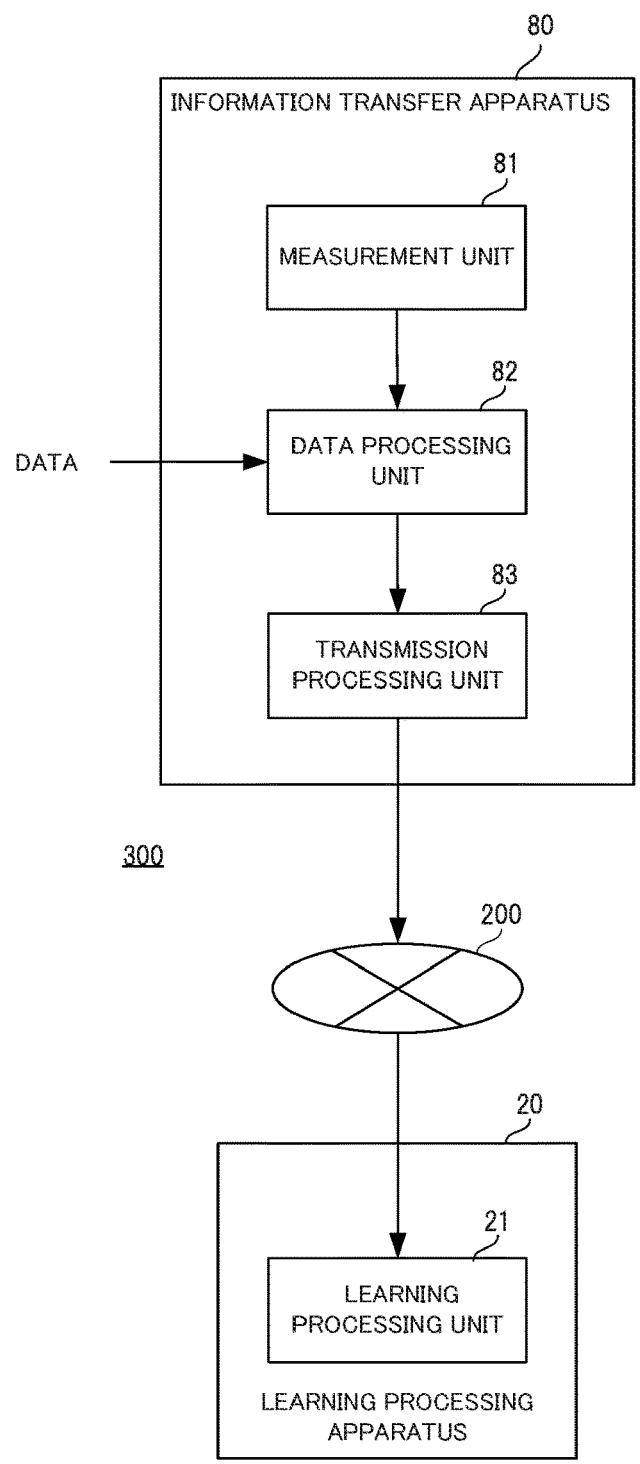
FIG. 13 is a block diagram showing schematic configurations of an information transfer apparatus and a learning system according to a fifth embodiment of the present invention.
Figure 14:
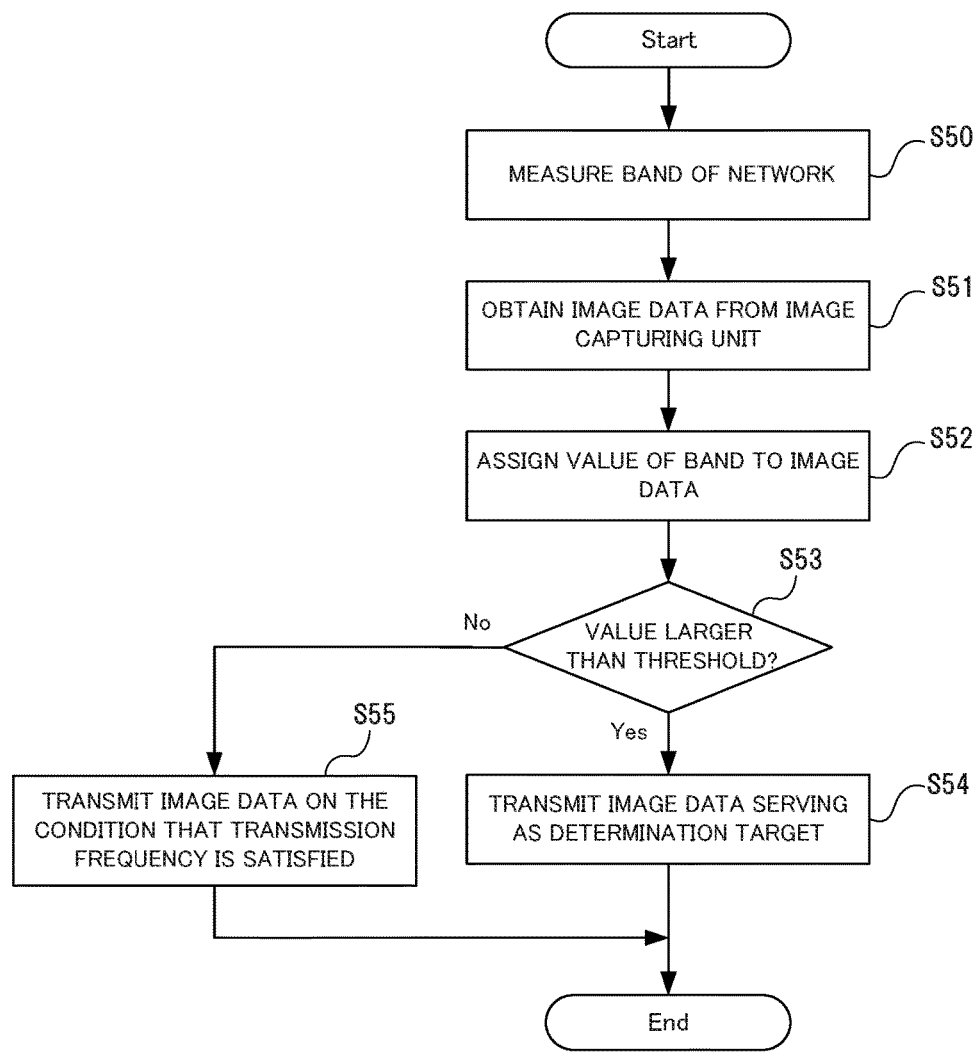
FIG. 14 is a flowchart of the operations performed by the information transfer apparatus according to the fifth embodiment of the present invention during processing for transmitting image data.

A description is now given of an information transfer apparatus, a learning system, an information transfer method, and programs according to a fifth embodiment of the present invention with reference to FIGS. 13 and 14.

[System Configuration]

First, configurations of the information transfer apparatus and the learning system according to the fifth embodiment of the present invention will be described with reference to FIG. 13. FIG. 13 is a block diagram showing schematic configurations of the information transfer apparatus and the learning system according to the fifth embodiment of the present invention.

As shown in FIG. 13, a learning system 300 according to the present fifth embodiment includes an information transfer apparatus 80 and a learning processing apparatus 20. The information transfer apparatus 80 and the learning processing apparatus 20 are connected via a network 200. Note that the learning processing apparatus 20 is similar to the learning processing apparatus shown in FIG. 1.

The information transfer apparatus 80 includes a measurement unit 81, a data processing unit 82, and a transmission processing unit 83. The measurement unit 81 measures the band of the network 200. The data processing unit 82 obtains data serving as a learning target, and assigns a value of the measured band to the obtained data. The transmission processing unit 83 transmits the data to the learning processing apparatus 20 based on a rule that has been set using the value of the band.

In the present fifth embodiment also, the data is, for example, image data output from an image capturing unit. In the present fifth embodiment, for example, the rule used by the transmission processing unit 83 stipulates that "all image data with a value of a band larger than a threshold is transmitted, and image data with a value of a band smaller than or equal to the threshold is transmitted such that a transmission frequency matches a set value."

[System Operations]

Next, a description is given of the operations of the information transfer apparatus 80 according to the present fifth embodiment with reference to FIG. 14. FIG. 14 is a flowchart of the operations performed by the information transfer apparatus according to the fifth embodiment of the present invention during processing for transmitting image data.

In the present fifth embodiment, the information transfer method is implemented by causing the information transfer apparatus 80 to operate. Therefore, the following description of the operations of the information transfer apparatus 80 applies to the information transfer method according to the present fifth embodiment. Note that the operations of the learning processing apparatus 20 according to the present fifth embodiment are similar to those according to the first embodiment.

First, as shown in FIG. 14, the measurement unit 81 measures the band of the network 200 (step S50). Next, the data processing unit 82 obtains image data from the image capturing unit as data serving as a learning target (step S51), and assigns a value of the measured band to the obtained image data (step S52).

Next, the transmission processing unit 83 obtains the image data that was assigned the value of the band in step S52, and determines whether or not the value of the band assigned to the image data is larger than the threshold (step S53).

If the result of determination in step S53 shows that the value of the band assigned to the image data (frame) serving as a determination target is larger than the threshold, the transmission processing unit 83 transmits this image data to the learning processing apparatus 20 (step S54).

On the other hand, if the result of determination in step S53 shows that the value of the band assigned to the image data (frame) serving as the determination target is smaller than or equal to the threshold, the transmission processing unit 83 transmits this image data to the learning processing apparatus 20 such that the transmission frequency matches the set value (step S55).

After step S54 or S55 is executed, processing ends. However, upon transmission of image data from the image capturing unit, step S50 is executed again. Steps S51 to S55 are executed repeatedly during transmission of image data from the image capturing unit 31.

[Effects of Fifth Embodiment]

As described above, the present fifth embodiment differs from the first embodiment in that whether or not data is to be transmitted is determined using the value of the band of the network in place of certainty degrees. According to the present fifth embodiment, a low communication frequency can be set when the band of the network is not sufficient, and a high communication frequency can be set when the band of the network is sufficient.

[Programs]

It is sufficient for a program according to the present fifth embodiment to cause a computer to execute steps S50 to S55 shown in FIG. 14. The information transfer apparatus 80 and the information transfer method according to the present embodiment can be realized by installing this program in the computer and executing the installed program. In this case, a central processing unit (CPU) of the computer functions as the measurement unit 81, the data processing unit 82, and the transmission processing unit 83, and executes processing. Note that a program for configuring the learning processing apparatus according to the present fifth embodiment is similar to its counterpart according to the first embodiment.

(Physical Configuration)

Figure 15:
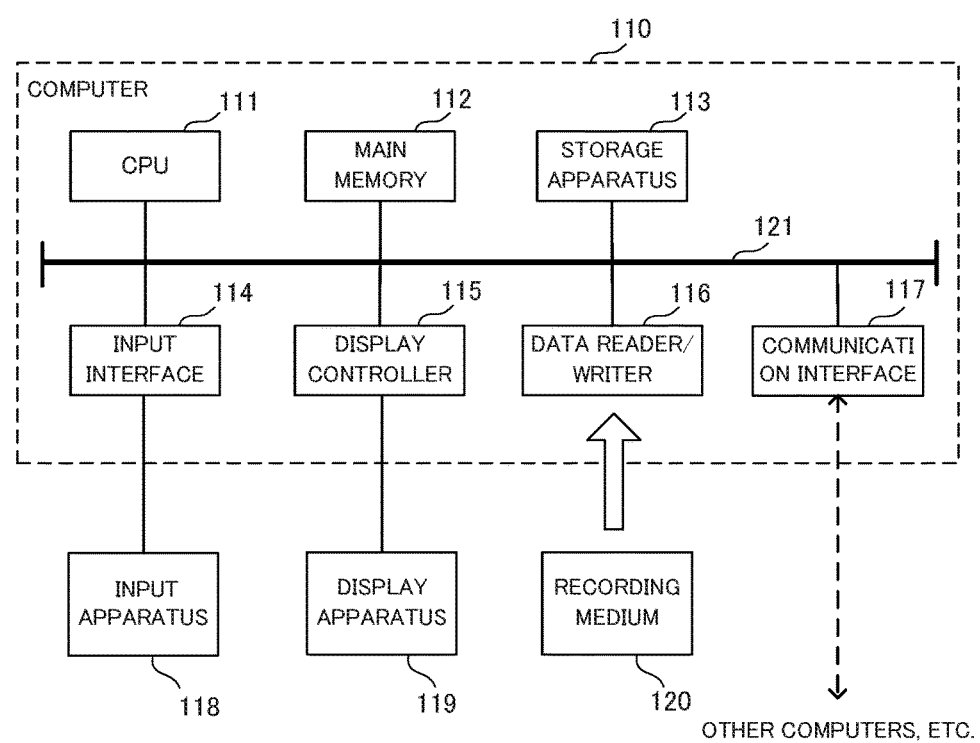
FIG. 15 is a block diagram showing an example of a computer that realizes the information transfer apparatuses and the learning processing apparatuses according to the first to fifth embodiments of the present invention.
Figure 16:
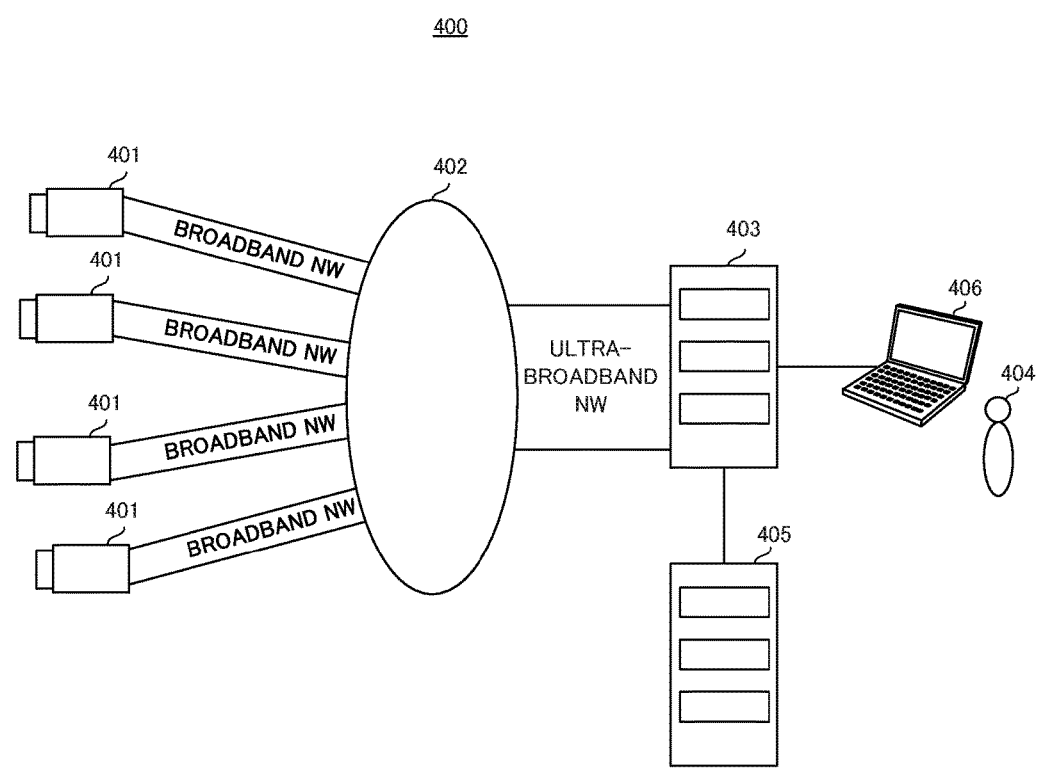
FIG. 16 shows a schematic configuration of a conventional surveillance system utilizing a broadband network.
Figure 17:
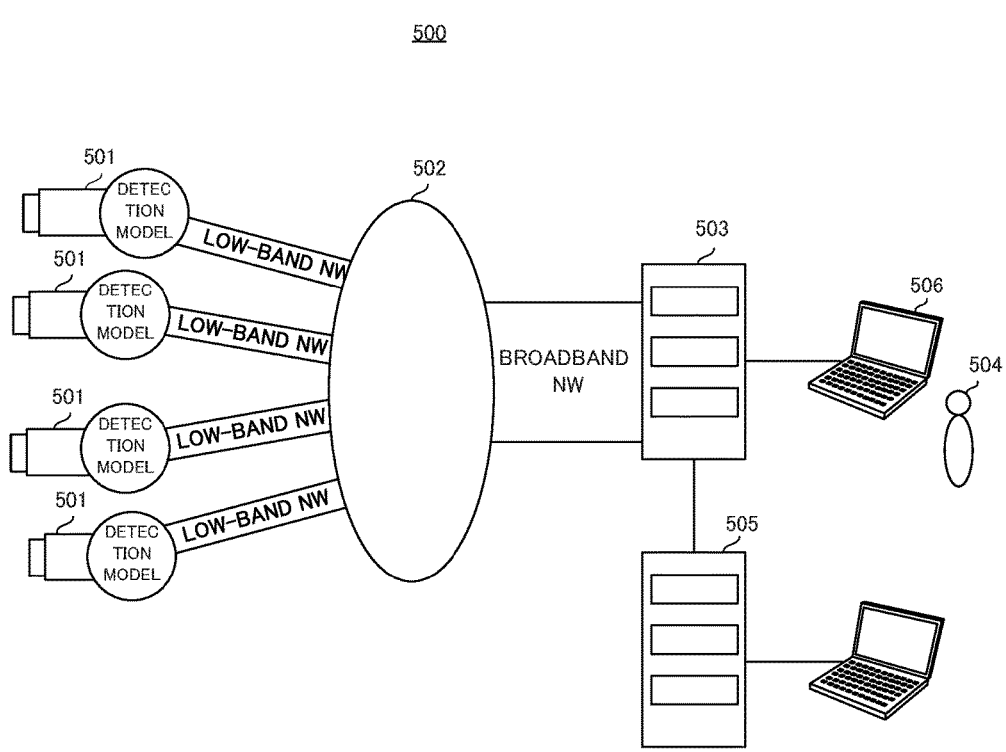
FIG. 17 shows a schematic configuration of a conventional surveillance system using surveillance cameras with an automatic surveillance function.

A description is now given of a computer that realizes the information transfer apparatuses and the learning processing apparatuses by executing the programs according to the first to fifth embodiments with reference to FIG. 15. FIG. 15 is a block diagram showing an example of a computer that realizes the information transfer apparatuses and the learning processing apparatuses according to the first to fifth embodiments of the present invention.

As shown in FIG. 15, a computer 110 includes a CPU 111, a main memory 112, a storage apparatus 113, an input interface 114, a display controller 115, a data reader/writer 116, and a communication interface 117. These components are connected in such a manner that they can perform data communication with one another via a bus 121.

The CPU 111 executes various types of calculation by deploying the programs (codes) according to the present embodiments stored in the storage apparatus 113 to the main memory 112, and executing the deployed programs in a predetermined order. The main memory 112 is typically a volatile storage apparatus, such as a dynamic random-access memory (DRAM). The programs according to the first to fifth embodiments are provided while being stored in a computer-readable recording medium 120. Note that the programs according to the first to fifth embodiments may be distributed over the Internet connected via the communication interface 117.

Specific examples of the storage apparatus 113 include a hard disk drive and a semiconductor storage apparatus, such as a flash memory. The input interface 114 mediates data transmission between the CPU 111 and an input apparatus 118, such as a keyboard and a mouse. The display controller 115 is connected to a display apparatus 119 and controls display on the display apparatus 119.

The data reader/writer 116 mediates data transmission between the CPU 111 and the recording medium 120. The data reader/writer 116 reads out the programs from the recording medium 120, and writes the result of processing of the computer 110 to the recording medium 120. The communication interface 117 mediates data transmission between the CPU 111 and other computers.

Specific examples of the recording medium 120 include: a general-purpose semiconductor storage apparatus, such as CompactFlash® (CF) and Secure Digital (SD); a magnetic storage medium, such as a flexible disk; and an optical storage medium, such as a compact disc read-only memory (CD-ROM).

A part or all of the above embodiments can be described as, but are not limited to, the following Supplementary Notes 1 to 20.

(Supplementary Note 1)

An information transfer apparatus including: an analysis unit that obtains data serving as a learning target, compares the obtained data with a reference model, and assigns, to the data, an index indicating a degree of worthiness of the data as the learning target; and a transmission processing unit that transmits the data to the outside based on a rule that has been set using the index.

(Supplementary Note 2)

The information transfer apparatus according to Supplementary Note 1, wherein the analysis unit obtains image data as the data, determines whether or not a target object appears in the image data by comparing the obtained image data with the reference model, and assigns a certainty degree to the image data as the index in accordance with a result of the determination, the certainty degree indicating how certain it is that the target object appears in the image data, and the transmission processing unit transmits the image data to the outside based on a rule that has been set using the certainty degree.

(Supplementary Note 3)

The information transfer apparatus according to Supplementary Note 2, wherein the rule stipulates that all image data with a certainty degree higher than a threshold is transmitted, and image data with a certainty degree lower than or equal to the threshold is transmitted such that a transmission frequency matches a set value.

(Supplementary Note 4)

The information transfer apparatus according to Supplementary Note 2, wherein the rule includes a plurality of rules stipulating that, when the number of times the certainty degree has exceeded a threshold is larger than a set number, most recent image data with a certainty degree higher than the threshold is transmitted, the threshold is different for each of the plurality of rules, and the transmission processing unit applies the plurality of rules in descending order of the threshold until the certainty degree exceeds the threshold.

(Supplementary Note 5)

A learning system including an information transfer apparatus and a learning processing apparatus, wherein the information transfer apparatus includes: an analysis unit that obtains data serving as a learning target, compares the obtained data with a reference model, and assigns, to the data, an index indicating a degree of worthiness of the data as the learning target; and a transmission processing unit that transmits the data to the learning processing apparatus based on a rule that has been set using the index, and the learning processing apparatus includes a learning processing unit that updates the model or generates a new model based on the data transmitted from the information transfer apparatus.

(Supplementary Note 6)

The learning system according to Supplementary Note 5, wherein the analysis unit obtains image data as the data, determines whether or not a target object appears in the image data by comparing the obtained image data with the reference model, and assigns a certainty degree to the image data as the index in accordance with a result of the determination, the certainty degree indicating how certain it is that the target object appears in the image data, and the transmission processing unit transmits the image data to the learning processing apparatus based on a rule that has been set using the certainty degree.

(Supplementary Note 7)

The learning system according to Supplementary Note 6, wherein the rule stipulates that all image data with a certainty degree higher than a threshold is transmitted, and image data with a certainty degree lower than or equal to the threshold is transmitted such that a transmission frequency matches a set value.

(Supplementary Note 8)

The learning system according to Supplementary Note 6, wherein the rule includes a plurality of rules stipulating that, when the number of times the certainty degree has exceeded a threshold is larger than a set number, most recent image data with a certainty degree higher than the threshold is transmitted, the threshold is different for each of the plurality of rules, and the transmission processing unit applies the plurality of rules in descending order of the threshold until the certainty degree exceeds the threshold.

(Supplementary Note 9)

The learning system according to Supplementary Note 5, wherein the learning processing apparatus further includes a rule management unit that causes the information transfer apparatus to change the rule.

(Supplementary Note 10)

The learning system according to Supplementary Note 6, wherein the information transfer apparatus is composed of a plurality of information transfer apparatuses, and the learning processing apparatus further includes a simulation execution unit that, with use of a model of one of the plurality of information transfer apparatuses, determines whether or not the target object appears in image data transmitted from another information transfer apparatus.

(Supplementary Note 11)

An information transfer apparatus connected to a network, the information transfer apparatus including: a measurement unit that measures a band of the network; a data processing unit that obtains data serving as a learning target, and assigns a value of the measured band to the obtained data; and a transmission processing unit that transmits the data to the outside based on a rule that has been set using the value of the band.

(Supplementary Note 12)

A learning system including an information transfer apparatus and a learning processing apparatus, wherein the information transfer apparatus and the learning processing apparatus are connected via a network, the information transfer apparatus includes: a measurement unit that measures a band of the network; a data processing unit that obtains data serving as a learning target, and assigns a value of the measured band to the obtained data; and a transmission processing unit that transmits the data to the learning processing apparatus based on a rule that has been set using the value of the band, and the learning processing apparatus includes a learning processing unit that updates a model or generates a new model based on the data transmitted from the information transfer apparatus.

(Supplementary Note 13)

An information transfer method including (a) a step of obtaining data serving as a learning target, comparing the obtained data with a reference model, and assigning, to the data, an index indicating a degree of worthiness of the data as the learning target; and (b) a step of transmitting the data to the outside based on a rule that has been set using the index.

(Supplementary Note 14)

The information transfer method according to Supplementary Note 13, wherein in step (a), image data is obtained as the data, whether or not a target object appears in the image data is determined by comparing the obtained image data with the reference model, and a certainty degree is assigned to the image data as the index in accordance with a result of the determination, the certainty degree indicating how certain it is that the target object appears in the image data, and in step (b), the image data is transmitted to the outside based on a rule that has been set using the certainty degree.

(Supplementary Note 15)

The information transfer method according to Supplementary Note 14, wherein the rule stipulates that all image data with a certainty degree higher than a threshold is transmitted, and image data with a certainty degree lower than or equal to the threshold is transmitted such that a transmission frequency matches a set value.

(Supplementary Note 16)

The information transfer method according to Supplementary Note 14, wherein the rule includes a plurality of rules stipulating that, when the number of times the certainty degree has exceeded a threshold is larger than a set number, most recent image data with a certainty degree higher than the threshold is transmitted, the threshold is different for each of the plurality of rules, and in step (b), the plurality of rules are applied in descending order of the threshold until the certainty degree exceeds the threshold.

(Supplementary Note 17)

A computer-readable recording medium having recorded therein a program including an instruction that causes a computer to execute: (a) a step of obtaining data serving as a learning target, comparing the obtained data with a reference model, and assigning, to the data, an index indicating a degree of worthiness of the data as the learning target; and
(b) a step of transmitting the data to the outside based on a rule that has been set using the index.

(Supplementary Note 18)

The computer-readable recording medium according to Supplementary Note 17, wherein in step (a), image data is obtained as the data, whether or not a target object appears in the image data is determined by comparing the obtained image data with the reference model, and a certainty degree is assigned to the image data as the index in accordance with a result of the determination, the certainty degree indicating how certain it is that a target object appears in the image data, and in step (b), the image data is transmitted to the outside based on a rule that has been set using the certainty degree.

(Supplementary Note 19)

The computer-readable recording medium according to Supplementary Note 18, wherein the rule stipulates that all image data with a certainty degree higher than a threshold is transmitted, and image data with a certainty degree lower than or equal to the threshold is transmitted such that a transmission frequency matches a set value.

(Supplementary Note 20)

The computer-readable recording medium according to Supplementary Note 18, wherein the rule includes a plurality of rules stipulating that, when the number of times the certainty degree has exceeded a threshold is larger than a set number, most recent image data with a certainty degree higher than the threshold is transmitted, the threshold is different for each of the plurality of rules, and in step (b), the plurality of rules are applied in descending order of the threshold until the certainty degree exceeds the threshold.

As described above, the present invention enables selective transmission of data that is worth learning. The present invention is effective in the fields that require learning, such as a surveillance system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information transfer apparatus comprising:
   at least one processor configured to operate as:
      an analysis unit that obtains data serving as a learning target, compares the obtained data with a reference model, and assigns, to the data, an index indicating a degree of worthiness of the data as the learning target; and
      a transmission processing unit that transmits the data to an external device based on a first rule that has been set using the index, wherein
      the analysis unit obtains image data as the data, determines whether a target object appears in the image data by comparing the obtained image data with the reference model, and assigns a certainty degree to the image data as the index in accordance with a result of the determination, the certainty degree indicating how certain it is that the target object appears in the image data,
      the transmission processing unit transmits the image data to the external device based on a second rule that has been set using the certainty degree,
      the second rule includes a plurality of rules stipulating that, when the number of times the certainty degree has exceeded a threshold is larger than a set number, most recent image data with a certainty degree higher than the threshold is transmitted,
      the threshold is different for each of the plurality of rules,
      the transmission processing unit applies the plurality of rules in descending order of the threshold until the certainty degree exceeds the threshold, and
      the plurality of rules is set such that as the threshold of the certainty degree and a transmission rate of the image data become small progressively, the set number becomes large progressively.

2. The information transfer apparatus according to claim 1, wherein
   the second rule stipulates that all image data with a certainty degree higher than a threshold is transmitted, and image data with a certainty degree lower than or equal to the threshold is transmitted such that a transmission frequency matches a set value.

3. A learning system comprising an information transfer apparatus and a learning processing apparatus, wherein
   the information transfer apparatus comprises at least one processor configured to operate as:
      an analysis unit that obtains data serving as a learning target, compares the obtained data with a reference model, and assigns, to the data, an index indicating a degree of worthiness of the data as the learning target; and
      a transmission processing unit that transmits the data to the learning processing apparatus based on a first rule that has been set using the index,
   the learning processing apparatus comprises at least one processor configured to operate as:
      a learning processing unit that updates the model or generates a new model based on the data transmitted from the information transfer apparatus, wherein
      the analysis unit obtains image data as the data, determines whether a target object appears in the image data by comparing the obtained image data with the reference model, and assigns a certainty degree to the image data as the index in accordance with a result of the determination, the certainty degree indicating how certain it is that the target object appears in the image data, and
      the transmission processing unit transmits the image data to an external device based on a second rule that has been set using the certainty degree, and
   the second rule includes a plurality of rules stipulating that, when the number of times the certainty degree has exceeded a threshold is larger than a set number, most recent image data with a certainty degree higher than the threshold is transmitted,
   the threshold is different for each of the plurality of rules,
   the transmission processing unit applies the plurality of rules in descending order of the threshold until the certainty degree exceeds the threshold, and
   the plurality of rules is set such that as the threshold of the certainty degree and a transmission rate of the image data become small progressively, the set number becomes large progressively.

4. An information transfer method comprising:
   (a) a step of obtaining data serving as a learning target, comparing the obtained data with a reference model, and assigning, to the data, an index indicating a degree of worthiness of the data as the learning target; and (b) a step of transmitting the data to an external device based on a first rule that has been set using the index, wherein the step of obtaining data includes obtaining image data as the data, determining whether a target object appears in the image data by comparing the obtained image data with the reference model, and assigning a certainty degree to the image data as the index in accordance with a result of the determining, the certainty degree indicating how certain it is that the target object appears in the image data, the step of transmitting includes transmitting the image data to the external device based on a second rule that has been set using the certainty degree, the second rule includes a plurality of rules stipulating that, when the number of times the certainty degree has exceeded a threshold is larger than a set number, most recent image data with a certainty degree higher than the threshold is transmitted, the threshold is different for each of the plurality of rules, the step of transmitting the data comprises applying the plurality of rules in descending order of the threshold until the certainty degree exceeds the threshold, and the plurality of rules is set such that as the threshold of the certainty degree and a transmission rate of the image data become small progressively, the set number becomes large progressively.

5. A computer-readable non-transitory recording medium having recorded therein a program including an instruction that causes a computer to execute:

(a) a step of obtaining data serving as a learning target, comparing the obtained data with a reference model, and assigning, to the data, an index indicating a degree of worthiness of the data as the learning target; and (b) a step of transmitting the data to an external device based on a first rule that has been set using the index, wherein the step of obtaining data includes obtaining image data as the data, determining whether a target object appears in the image data by comparing the obtained image data with the reference model, and assigning a certainty degree to the image data as the index in accordance with a result of the determining, the certainty degree indicating how certain it is that the target object appears in the image data, the step of transmitting includes transmitting the image data to the external device based on a second rule that has been set using the certainty degree, the second rule includes a plurality of rules stipulating that, when the number of times the certainty degree has exceeded a threshold is larger than a set number, most recent image data with a certainty degree higher than the threshold is transmitted, the threshold is different for each of the plurality of rules, the step of transmitting the data comprises applying the plurality of rules in descending order of the threshold until the certainty degree exceeds the threshold, and the plurality of rules is set such that as the threshold of the certainty degree and a transmission rate of the image data become small progressively, the set number becomes large progressively.

\* \* \* \* \*